May 15, 1923. 1,454,841
W. G. ALLEN
FEEDING MECHANISM FOR DIEING AND OTHER MACHINES
Filed Nov. 13, 1920 6 Sheets-Sheet 1
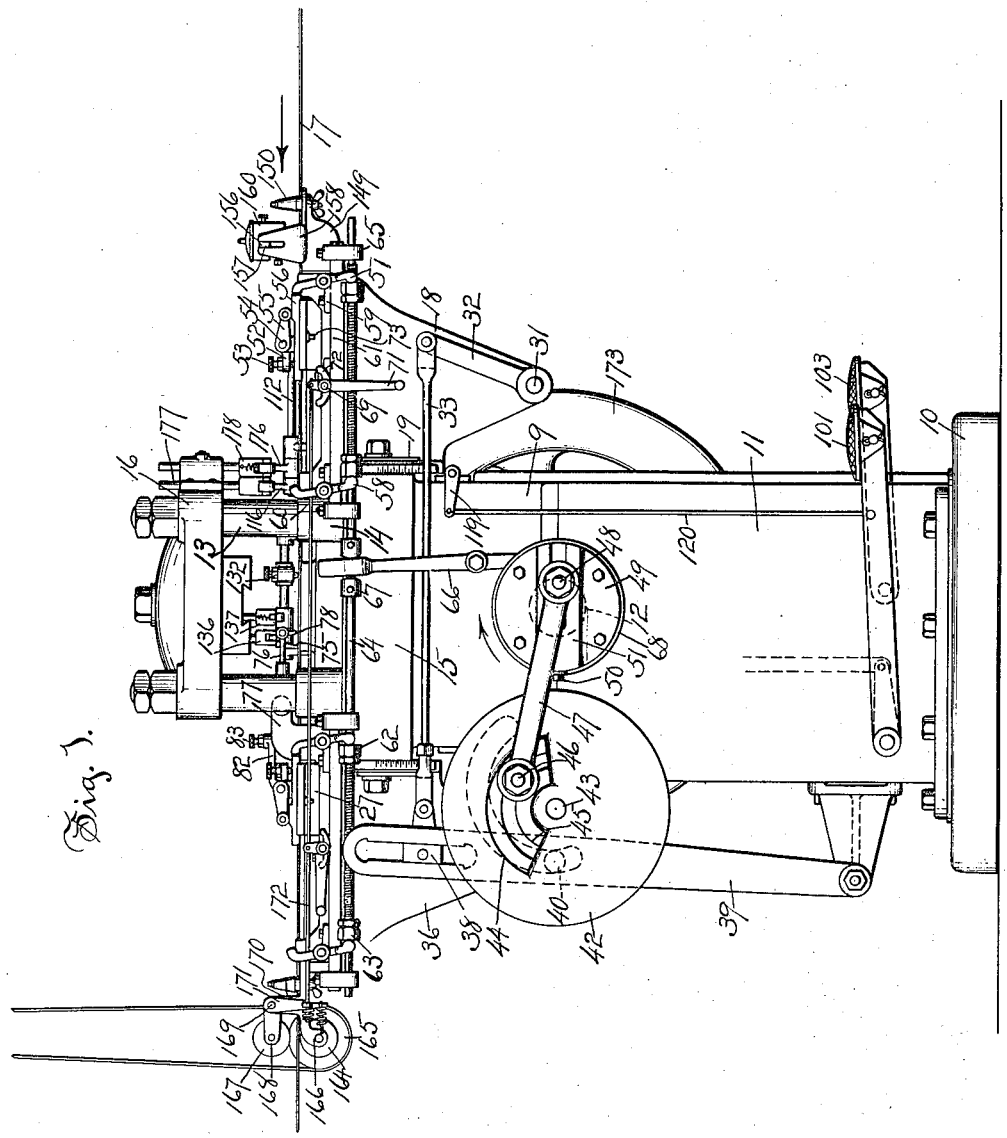
INVENTOR:
William G. Allen.
BY
Arthur B. Jenkins,
ATTORNEY.

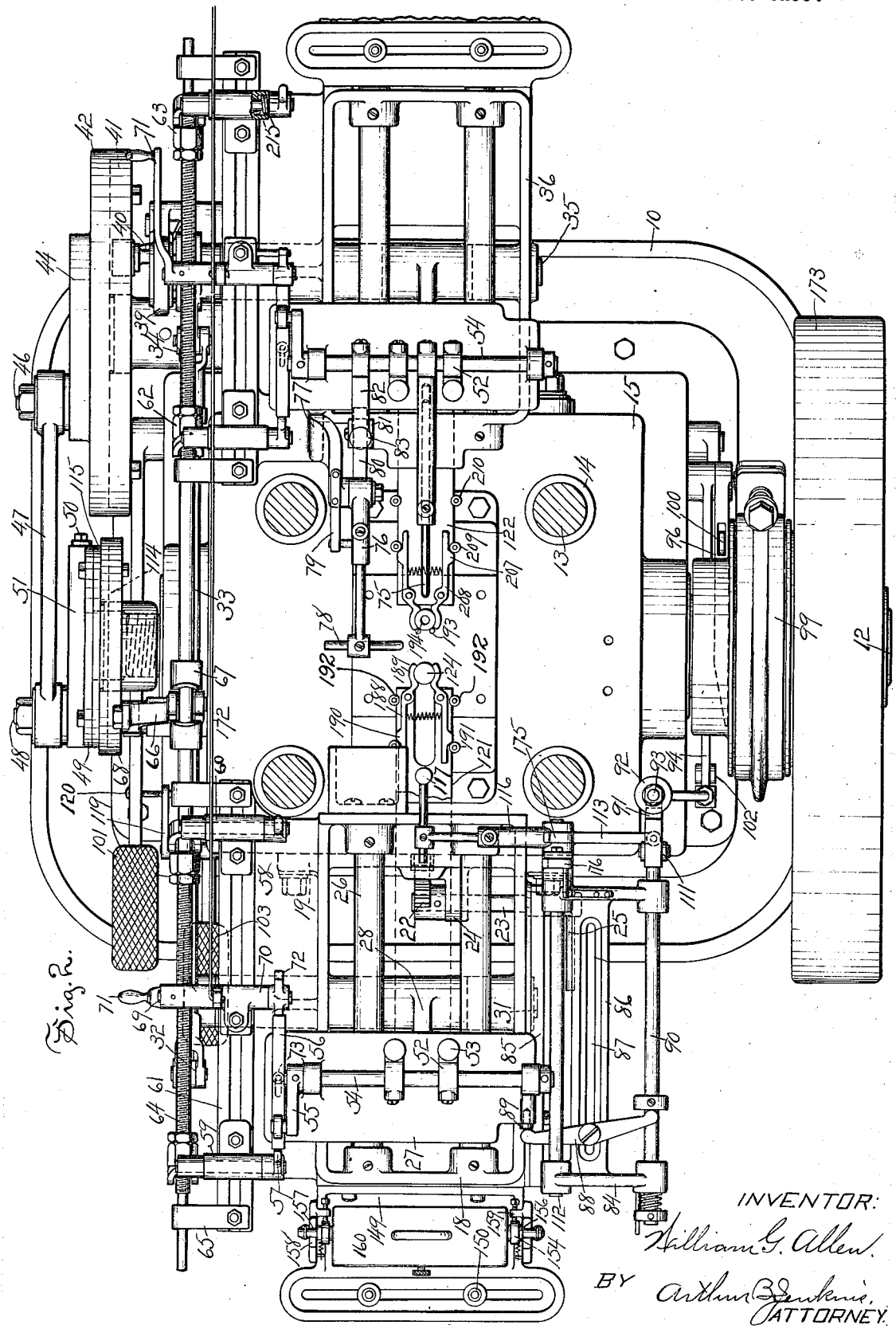

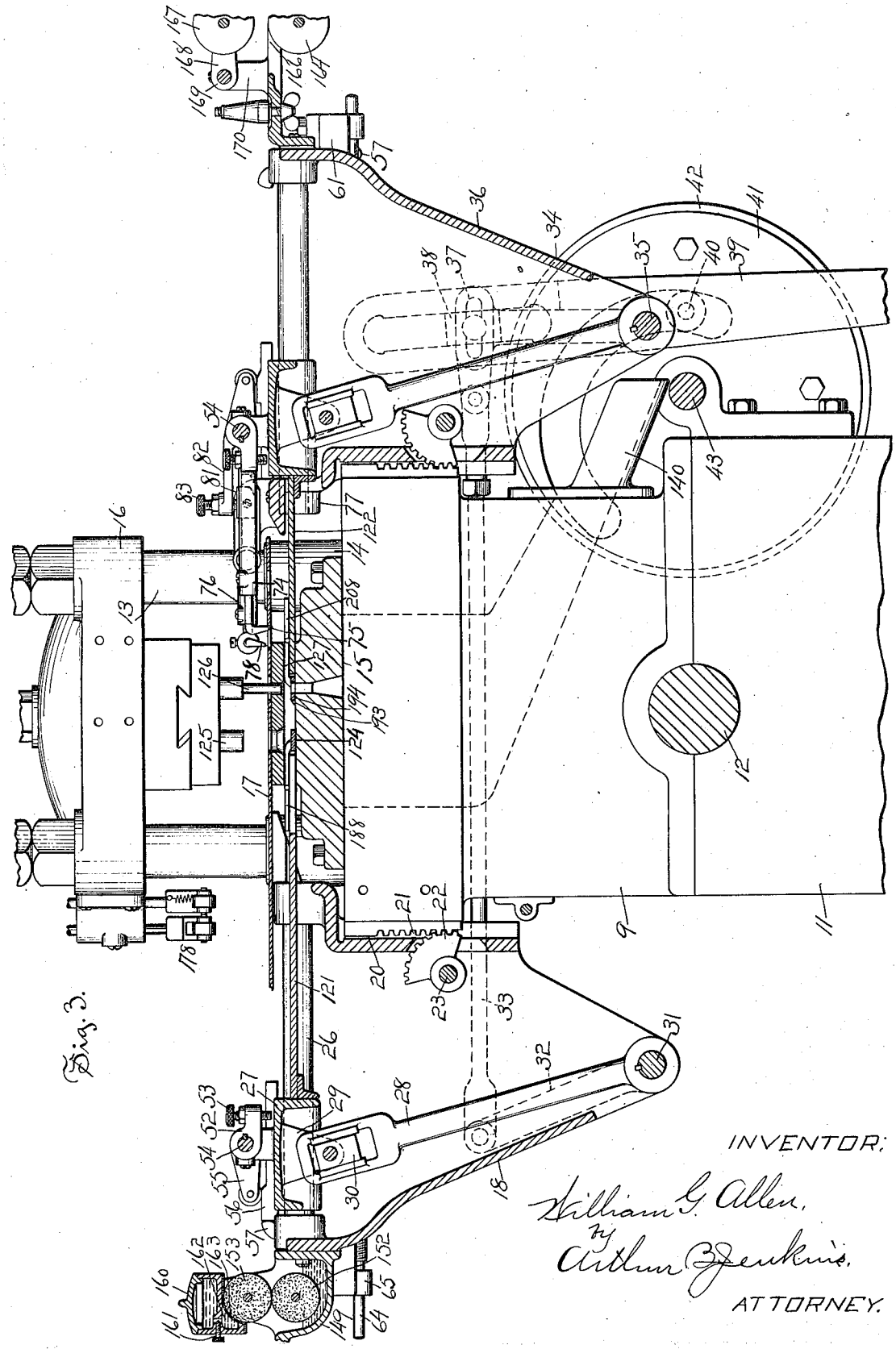

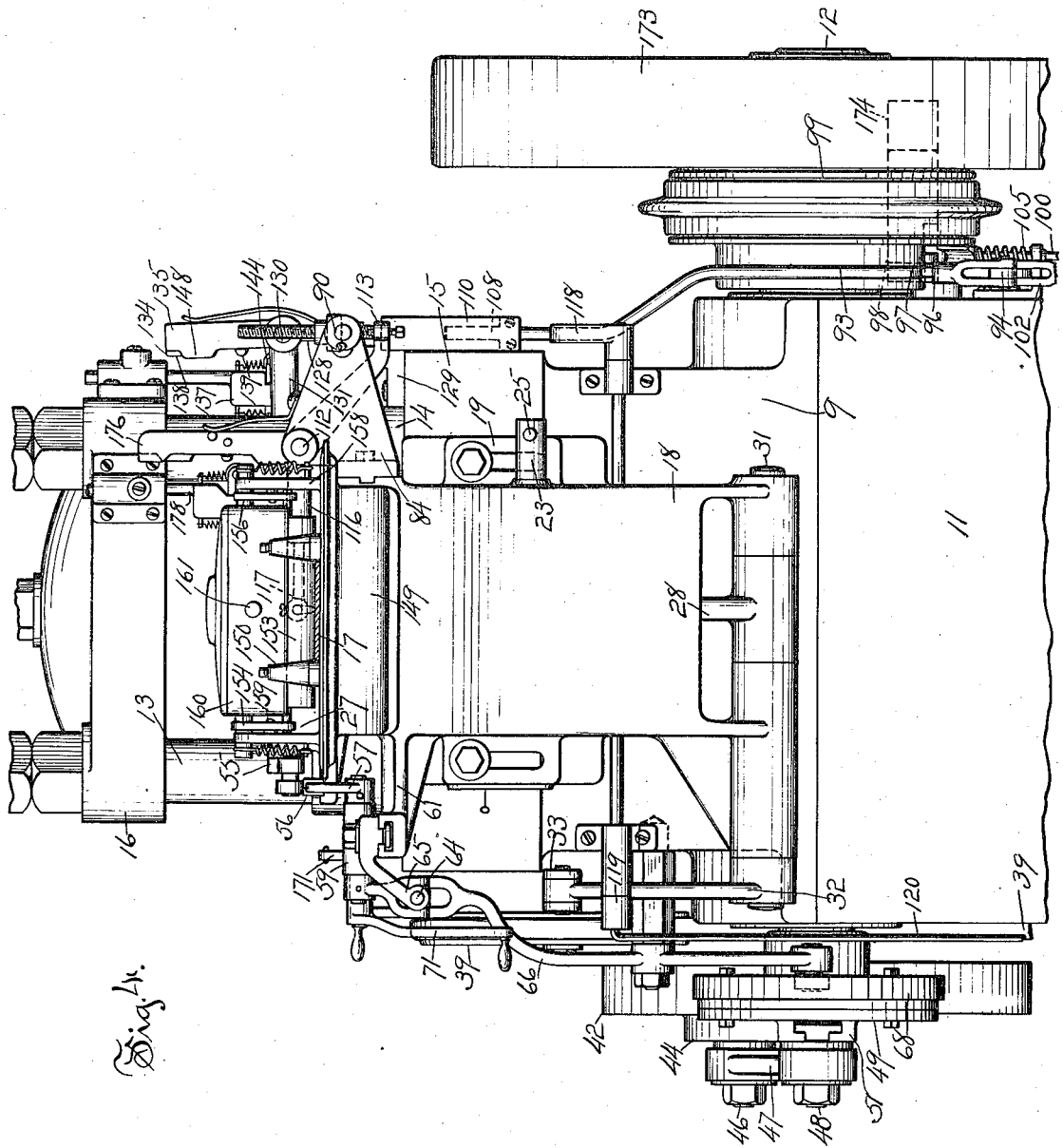

May 15, 1923.
W. G. ALLEN
1,454,841
FEEDING MECHANISM FOR DIEING AND OTHER MACHINES
Filed Nov. 13, 1920
6 Sheets-Sheet 5
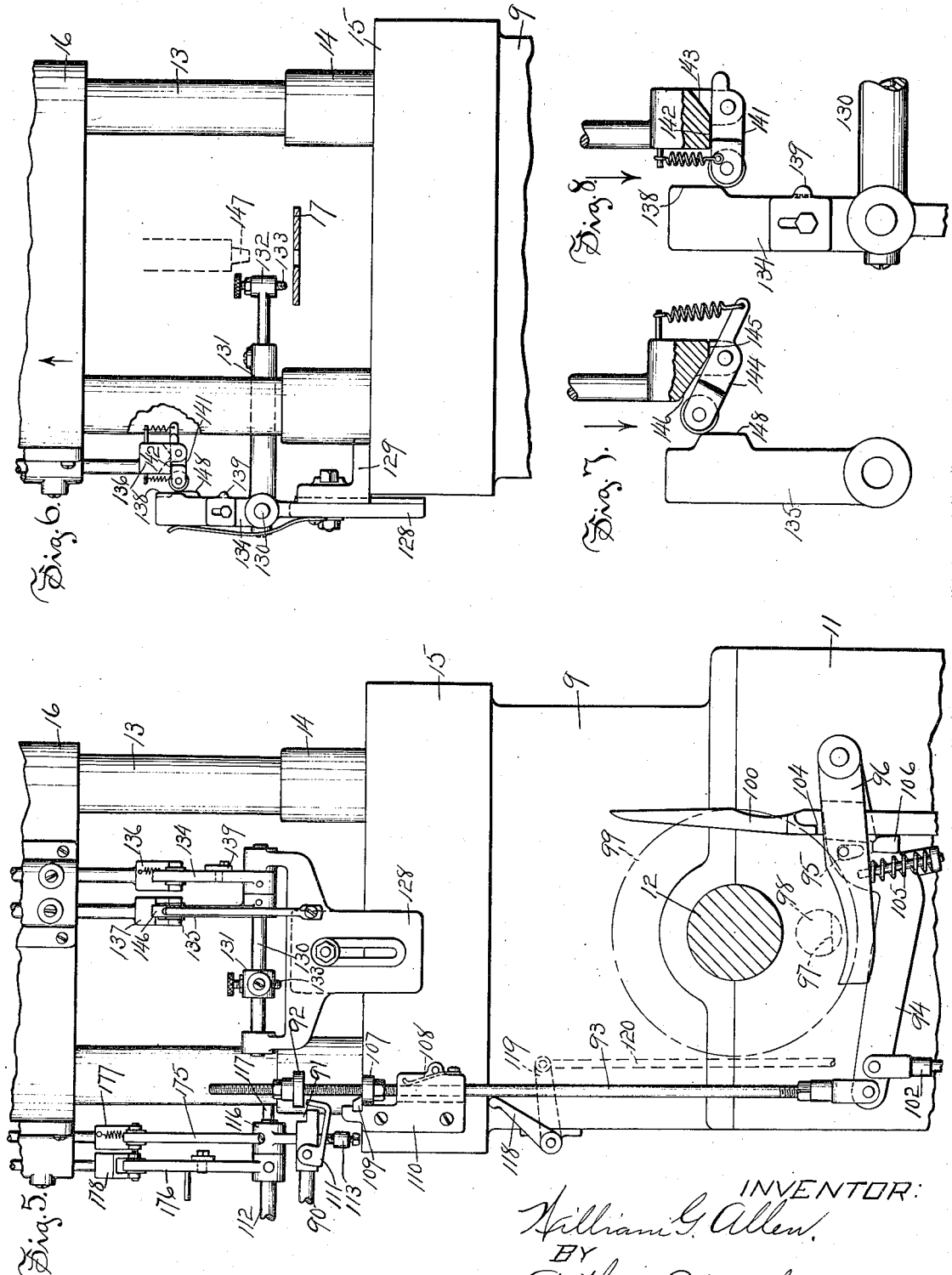
INVENTOR:
William G. Allen.
BY
Arthur B. Jenkins,
ATTORNEY.

May 15, 1923. 1,454,841
W. G. ALLEN
FEEDING MECHANISM FOR DIEING AND OTHER MACHINES
Filed Nov. 13, 1920 6 Sheets-Sheet 6
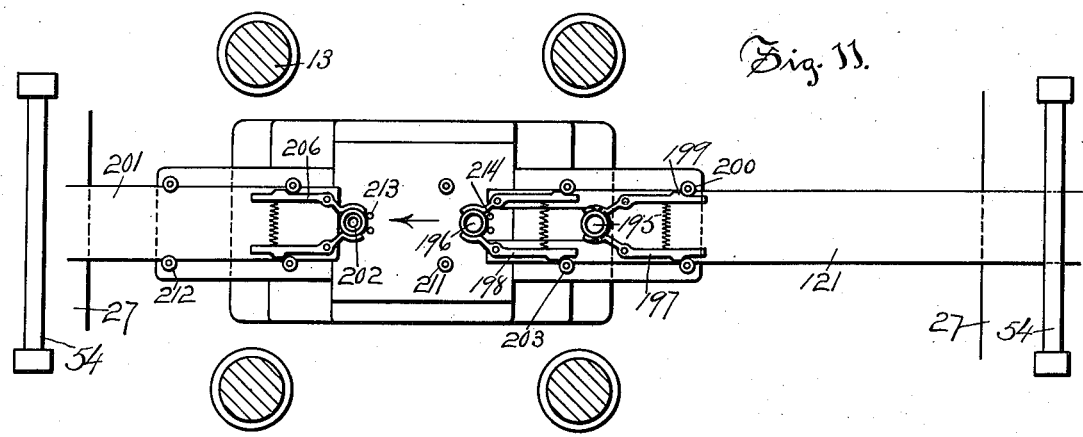
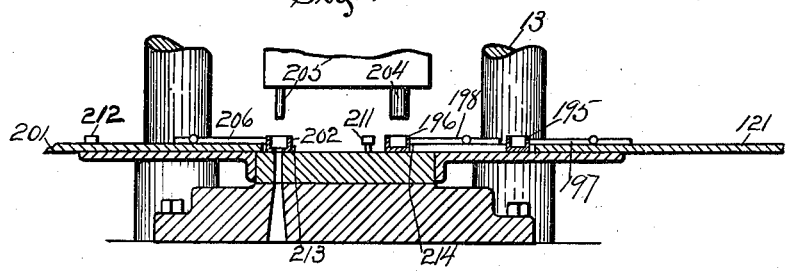
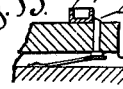
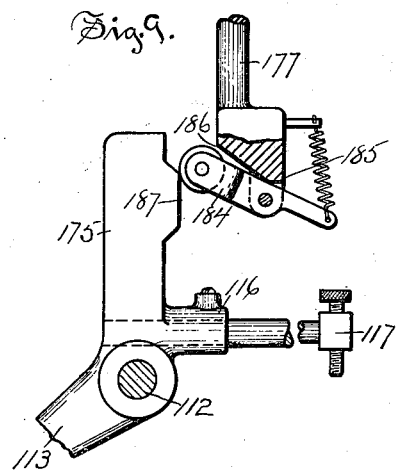
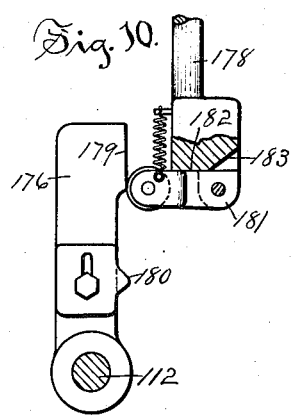
INVENTOR
William G. Allen,
BY
Arthur B. Jenkins,
ATTORNEY Patented May 15, 1923.

1,454,841

UNITED STATES PATENT OFFICE.

WILLIAM G. ALLEN, OF HARTFORD, CONNECTICUT.

FEEDING MECHANISM FOR DIEING AND OTHER MACHINES.

Application filed November 13, 1920. Serial No. 423,910.

*To all whom it may concern:*

Be it known that I, WILLIAM G. ALLEN, a citizen of the United States, and a resident of Hartford, in the county of Hartford and State of Connecticut, have invented new and useful Improvements in Feeding Mechanism for Dieing and Other Machines, of which the following is a specification.

This invention relates to that class of machines equipped with dies for cutting, stamping and otherwise performing operations upon sheet material or separate articles, and an object of the invention, among others, is to provide a machine of this type that shall be extremely efficient in operation and that shall perform the work required of it in a particularly complete manner.

One construction of machine embodying this invention and in the construction and use of which the objects herein set out, as well as others, may be attained, is illustrated in the accompanying drawings, in which—

Figure 1 is a view in elevation of a machine embodying my invention, the feed operating levers at the right being shown as just moved from their positions of rest.

Figure 2 is a view, scale enlarged, looking down upon the table and with the plunger columns cut off to remove the head, and the waste removing rolls and the holding mechanism also being removed for sake of clearness.

Figure 3 is a view in vertical section of the upper part of the machine and looking in the opposite direction from that in which Figure 1 is viewed, the scale being enlarged over that of Figure 1 and the controllers of the holding mechanism being removed from the head.

Figure 4 is an elevation of the upper part of the machine from a point located at the right in Figure 1, the scale being enlarged and the dies being removed.

Figure 5 is an elevation on enlarged scale of the upper part of the machine from a point located on the opposite side of the machine from that of Figure 1, the feed brackets being removed and the driving wheel being removed by cutting the crank shaft.

Figure 6 is a similar view illustrating the construction of the mechanism for holding the strip of stock.

Figures 7 and 8 are detail views on enlarged scale illustrating the construction and operation of the releasing bars of the strip holding mechanism.

Figures 9 and 10 are similar views as to the releasing bars of the starting and stopping gage.

Figure 11 is a plan view illustrating a cut and carry slide having a plurality of holding stations thereon.

Figure 12 is a view in vertical section through the same.

Fig. 13 is a section showing one of the spring pressed stop pins provided for preventing retrograde movement of a piece of work.

In the accompanying drawings the numeral 10 indicates a base having a supporting box 11 within which a crank shaft 12 is horizontally mounted, the cranks (not herein shown) of which are suitably connected with and to effect vertical reciprocation of plunger columns 13 mounted in bearings 14 on a table 15. These columns support a head 16 adapted to receive a die or other implement, and the table is suitably constructed to receive a cooperating die, such dies being omitted from some of the figures as not necessary to an understanding of the invention. The machine illustrated herein and thus far described is of that type illustrated and described in United States patent to Daniel M. Wright, No. 1,270,913, dated July 2nd, 1918, to which reference is hereby made for a complete understanding of the machine thus far described if such shall be desired, the illustration and description herein being all that is required for a complete understanding of the present invention, that has to do more especially with means for feeding a strip of material or separate objects to the dies and with means for preventing injury to the dies from operation upon an incomplete portion of a blank.

A strip 17 of material may be extended from a suitable support mounted in any desired manner, and the waste portion of this strip, left after the operations thereon have been completed, may be disposed of as by winding upon a waste reel or otherwise, as may be desired. The invention of this application comprises means for feeding such strip of material or objects by an intermittent movement before action thereon by such dies or other implements, as well as means for feeding such strip or objects after such action, such mechanisms operating in unison upon said strip when it is long enough to be engaged by both of said mechanisms. The mechanism above referred to for feeding the strip after it has been acted upon by the dies embodies positive means for moving the strip, which is a very desirable feature, but as this positive feed cannot always be made use of in feeding the strip before it has been acted upon by the dies, the hereinbefore mentioned frictional feeding mechanism may be made use of at this time.

Such frictional feed includes in its construction a bracket 18 secured to the table 15, which bracket extends below the table, said extended part of the bracket being spaced from the table support 9 projecting from the under side of the table and secured to the box 11 on a horizontal plane passing through the axis of the shaft 12, this table support in fact comprising the upper part of said box. This bracket is vertically adjustable as my means of bolts inserted through slots in ears 19 projecting from opposite sides of the bracket, as shown in Figure 4 of the drawings, and into the side of the table 15. This bracket is hollow, having an opening extending vertically therethrough with front, back and side walls, the back wall having a vertically extending rib at about its crosswise center formed to create a recess 20 to inclose a bracket adjusting rack 21 secured to the vertical wall of the table, as shown in Figure 3. A toothed adjusting segment 22 projects through an opening in said rib to engage the teeth of the adjusting rack, this segment being secured to a bracket adjusting shaft 23 rotatably mounted in the side walls of the bracket and in a lug 24 on the back wall thereof, the end of said shaft projecting beyond one of said side walls to receive a handle 25 by means of which the shaft may be manually rotated to place the bracket in different vertical positions.

Guides 26 extend across the opening in the bracket near the top thereof, the ends of said guides being secured in openings in bosses extending from the front and back walls of the bracket, as shown in Figures 2 and 3 of the drawings. A gripper carrier 27 is mounted for reciprocating movement on said guides that project through openings in said carrier. The end of a gripper carrier operating lever 28 extends into a space between two projections 29 from the under side of the carrier 27, a pivot mounted in said projections and extending into a sliding block 30 located in a slot in the end of said lever connecting the latter with said carrier. The lever 28 is secured to a rock shaft 31 mounted in the side parts of the bracket, one of which side parts is provided with a graduated scale to be used in connection with an index mark on the table 15 (see Figures 1 and 4) to determine the amount of adjustment of the bracket. A feed operating arm 32, secured at its lower end to the shaft 31 outside of the bracket, is pivotally connected at its upper end to one end of a feed connecting rod 33, the opposite end of said rod being pivotally connected to an extension from a positive feed operating arm 34 secured to a rock shaft 35 mounted in the side parts of a bracket 36 similar to the bracket 18 hereinbefore described, said brackets being mounted on opposite sides of the machine one from the other. A bolt secured in a slot 37 in the upper end of the arm 34 extends into a bearing block 38 slidably mounted in a slot in a feed operating lever 39 pivotally secured at its lower end in a bracket projecting from the side of the box 11, as shown in Figure 1.

The lever 39 is operated by means of a stud 40 supporting a roller in a cam slot of any desired shape, preferably one imparting, through the mechanism hereinbefore described, a reciprocating movement to the carrier 27 with a certain pause at the end of the movement toward the left, as shown in Figure 1, of considerable length as compared to the pause at the end of movement in the opposite direction; one use of the said pause of considerable length is to allow a pilot or leader of a punch, to be hereinafter described, to enter or leave the material while said carrier is remaining stationary. Said cam slot is made in a cam disk 41 secured in a cam box 42 rotatably mounted on a cam box supporting stud 43 projecting from a bracket secured to the side of the upper part of the box 11, as shown in Figure 3. A segment 44 on the opposite side of the cam box from the cam disk 41 has a T-shaped slot 45 within which the head of a crank stud 46 is secured, which stud receives one end of a pitman 47, the other end of which pitman is pivotally secured to a T-headed bolt, 48, the head of which is secured in a T-shaped slot in a crank disk 49 secured as my means of bolts to a cam box and coupling disk to be hereinafter referred to, an adjusting screw 50 extending through a rib 51 on the face of the disk 49 and into the head of the bolt 48 as a means for adjusting the position of said bolt in the slot in the disk to impart more or less throw to the cam box 42.

It will be noted that in the operation of the mechanism just above described an oscillating movement is imparted to the cam 41 that operates the lever 39, and the latter, thru the connections above described imparts reciprocating movement to the gripper carrier 27 upon which the grippers are supported, these grippers comprising gripper heads 52 within which gripper screws 53 are secured for the purpose of acting upon a strip of material to move it underneath the dies of the machine. The heads 52 are secured to a gripper shaft 54 mounted in bearings on the carrier 27, said shaft having a gripper operating arm 55 bearing a roller positioned to encounter a gripper operating cam bar 56 mounted for reciprocating movement in a groove in the upper surface of the carrier 27, said bar having a pin 73 projecting from its under surface into a slot in an overhanging part of the carrier, as shown in Figure 1 of the drawings. The bar 56 is operated by means of feed operating levers 57—58 each of which comprises a shaft mounted in a bearing 59 or 60 adjustably secured in a T-shaped groove in the upper surface of a shelf 61 projecting laterally from the upper edge of the bracket 18, as clearly shown in Figure 4 of the drawings. By this means the position of each lever may be nicely fixed so that its upper end will engage the bar 56 to operate it at the proper time, and the lower forked end of each lever will be in position to properly engage gripper lever actuators 62—63, herein shown as in the form of nuts mounted on a screw threaded feed actuating rod 64 mounted in bearing arms 65 secured as in the groove hereinbefore mentioned in the shelf 61, lock nuts being employed to secure the actuators in place, as clearly shown in Figure 1 of the drawings. Means, not shown, are employed to hold the levers 57—58 in a normal position of rest where they will not be struck by a bar 56 in its movement.

A feed rod actuating lever 66 is pivotally mounted on the table support 9 with its upper forked end receiving the rod 64 between feed rod abutments 67, by means of which said rod is positively moved in opposite directions. The lower end of the lever 66 has a stud bearing a roller located in a cam groove in the face of a feed operating cam 114 secured in a cam box 68, said box being adjustably secured to a coupling disc 115 as by bolts passing through slots in both the box and disc, said disc in this case being secured to the crank shaft 12 by interengaging screw threads on a disc hub projecting through said box and cam.

In the operation of these grippers the carrier 27 has a reciprocating movement imparted to it in a manner that will be readily understood from the foregoing description. The members of the mechanism being in the positions shown in Figure 1 of the drawings, it will be noted that the grippers are in a gripping condition and ready to move toward the left to feed a strip of material in that direction to the dies. As the grippers nearly complete their movement in this direction, the cam bar 56 will be moved by the carrier into proximity with the upper end of the lever 58. When the carrier 27 has completed its movement in this direction and the lever 58 is positioned as described, the cam 68 will operate the lever 66 and thereby the lever 58 will be pressed against the bar 56 that will thus be operated to release the grippers. As the carrier carrying the grippers is moved in the opposite direction, or toward the right the lever 57 will be moved from the position shown in Figure 1 so that its lower end will be located toward the left and in the path of the actuator 62 that will operate, in the manner just described as to the lever 58, said lever 57 and bar 56 to cause engagement of the grippers with the strip of material preparatory to moving it along.

The parts are so arranged and timed one with respect to another that the gripper carriers assume a position substantially half way between their extreme limits of movement when the head 16 is in its uppermost position, the grippers on opposite sides of the head reaching these central positions during their respective feeding movements, that is, when they are engaged with the strip of material.

Should it be desired to release or lock the feed devices at this time a manually operated releasing device is provided that comprises a releasing lever including a shaft 69 mounted in a bearing 70 adjustably secured in the slot in the shelf 61, a handle 71 projecting from said shaft at one end and releasing fingers 72 projecting upwardly from the opposite end of said shaft in position to engage the lower end of the pin 73, when said lever is rocked as by means of its handle, and thereby move the cam bar to release or lock the feed devices.

A positive feeding mechanism located on the opposite side of the machine from that above described comprises the same construction of mechanism as that just set out except as to the parts now to be described. The foregoing description may therefore be taken as a description of the feeding mechanism on both sides of the machine with the following exceptions:

A feeding arm 74 is secured to the shaft 54 on this side of the machine and a feed finger 75 is adjustably secured to the arm with a down turned end to engage within openings in the strip of material made by the dies on the head 16 or otherwise formed in said strip. A stop lever 76 is pivotally mounted on a stop lever bracket 77 rising from the back edge of the bracket 36, as shown in Figure 2 of the drawings, and a stop rod bearing a down turned stop finger 78 is adjustably secured in a socket in said stop lever, said finger being adapted to engage within the openings formed in the strip of material by the dies on the head 16 and thereby stop the movement of said strip when in proper position to receive the action of the dies. This rod and the finger thereon are held in their lower positions by means of a spring 79 secured to the bracket 77 and pressing upon a pin projecting from the side of the lever 76, as shown in Figure 2. A tail 80 on said lever has a striking piece 81 with a groove in its under surface to receive the tail 80, upon which tail said striking piece is seated and held as by means of a screw, and by means of which the position of the striking piece on the tail may be adjustably located for a purpose to be hereinafter described. A stop operating arm 82 is secured to the shaft 54 with its end overlying the tail 80 when the carrier 27 is in its forward position, as shown in Figure 2 of the drawings. A striking screw 83 projects from the arm to engage the striking piece 81. The shaft 54 at this side of the machine has the gripper heads 52 and appurtenant parts, together with the mechanism for operating them as hereinbefore described, with the exception that the handle 71 is located in a horizontal position to avoid the lever 39. The feed actuating rod 64 is extended, as shown in Figure 1, and provided with the stops 62—63 at this end of the rod to actuate the levers 57—58, the position of which levers and stops with respect to the head 16 is reversed from the position of the same parts on the opposite side of said head, and the cam on the bar 56 is positioned to rock the heads 52 downwardly when the rod 64 moves to the right, as shown in Figure 1, and in the same manner as it rocks the heads downwardly on the opposite side of the machine when it moves to the right.

In this downward movement of the parts on the shaft 54 bearing the positive feed devices the feed finger 75 held in the feeding arm 74 engages the edge of an opening previously made in the strip of material and at the same time the downward movement of the arm 82 operates to raise the stop lever 76 to raise the stop finger 78 from engagement with the edge of an opening previously made in the strip of material and holds said finger in this raised position long enough for the "bridge" between the holes in the strip of material to pass underneath said finger, said strip being moved by feed finger 75 supported by the carrier 27 when said carrier is moved to the right as shown in Figure 2 by the mechanism hereinbefore described. As the arm 82 moves to the right far enough to disengage the screw 83 from the striking piece 81, the finger 78 will be lowered into the next desired opening in the strip of material to engage the edge of said opening and thereby stop the movement of said strip. As the arm 82 moves to the right far enough to disengage the screw 83 from the striking piece 81, the finger 78 will be lowered into a succeeding opening in the strip of material to engage the edge of said opening and thereby stop the movement of said strip. The adjustability of the finger enables it to be positioned to engage the edge of the openings to stop the movement of the strip at the proper time, and the adjustability of the striking piece 81 enables the time of release of the tail 80 from the striking screw 83 to properly position the finger 78 to be accurately determined.

The operation of a portion only of a die upon a piece of material is very injurious to the die, and in order to prevent such operation of a die when there is not enough material under it to cover its whole working face a starting and stopping gage is provided by the use of which a strip of material may be brought up against a finger of this gage when said material is inserted in the machine, and this will determine the proper position of the material to receive the full working face of the die or punch at the first operation on said material and it will likewise act to stop the machine when the strip of material is in a position to receive the last full operation of the die.

This gage comprises a starting and stopping gage bracket secured to the side of the bracket 18 as by means of an intermeshing tongue and groove, as shown in Figure 4 of the drawings, and having side parts 84, back 85 and a cross piece 86 (see Figure 2). A slot 87 in the cross piece receives the pivot of a knock-off lever 88 having one end located to be engaged by the head of a strike screw 89 on the carrier 27 and its opposite end in contact with a collar on a knock-off bar 90 mounted for lengthwise reciprocating movement in bearings in the side parts 84. This bar is forced in one direction as by a spring, and the lever moves it in opposition to the spring when actuated by said carrier. The end of the bar 90 has a notch 91 to receive a knock-off collar 92 on a clutch releasing rod 93 when the bar 90 is at one limit of its play.

The rod 93 is connected at its lower end to a continuous clutch lever 94 pivotally mounted on the side of the machine (see Figure 5) and having a slot 95 in its side to receive a pin projecting from the side of a clutch disengaging shoe 96 pivotally mounted on the side of the machine to engage a recess 97 in the under side of a spring pressed clutch pin 98 that has an endwise movement in a clutch disk 99 to engage a clutch socket 174 in a driving wheel 173 (see Figure 4) to clutch said parts together in a manner that will be readily understood, the clutch mechanism, of itself, being of old and well known construction, and for which reason a more detailed illustration is omitted herein, the present invention concerning the connection, as of the rod 93, with the lever 94, and the means for operating said rod. It will be understood that the clutch member or disk 99 is secured to the shaft 12, and when the pin 98 is engaged with the other pin said shaft will be rotated. This old clutch mechanism also comprises an intermittent clutch actuating bar 100 connected by a pedal shaft and arm secured thereto with an intermittent clutch pedal 101 pivotally mounted on the opposite side of the machine from said arm, the lever 94 being connected by a continuous clutch actuating rod 102 and a rock shaft and arm, similar to that just described, with a continuous clutch actuating pedal 103 pivotally mounted on the opposite side of the machine from said arm. As will be readily understood by those acquainted with the operation of clutches of this type, when the bar 100 is moved downwardly by its pedal, which bar passes upwardly through an opening in the shoe 96, a shoulder 104 on the bar will engage a plate on the edge of said opening and move the shoe from engagement with the pin 98, that, under the action of its spring, will move forward to engage its clutch socket 174 and thereby effect the clutching action. As the pin 98 revolves it will strike the upper end of the bar 100 and so move said bar as to disengage the shoulder 104 from the plate on the shoe, and the latter will, under the action of a spring 105 move upwardly into position to engage within the recess 97 and thereby disengage the clutch pin and stop rotation of the shaft 12 that, therefore, can have but a single rotation at each operation of the pedal 101, the momentum of the machine carrying the pin 98 sufficiently past the bar 100 in each operation of the parts to permit said bar to assume a position to again actuate the shoe 96 when the pedal 101 is again pressed down.

When, however, the pedal 103 is pressed down, the upper part of the recesses 95 will engage the pin on the shoe 96 and move said shoe downwardly out of engagement with the pin 98, permitting the latter to act to clutch the members together, and so long as the lever 94 is maintained in this position the shaft will continue to rotate and the machine to thereby operate. Under these conditions a lug 106 on the lever 94 will press against the bar 100 and move it out of the path of the pin 98, and thus avoid the objectionable noise which would otherwise be occasioned by the pin in its revolutions striking the bar.

When the clutch releasing rod 93 is moved downwardly as by the pedal 103, a stop collar 107, adjustably mounted on said rod, is moved, as by a spring 108 acting against said rod, underneath a stop plate 109 supported by a bracket 110 secured to the side of the table 15, this bracket also having a bearing for the rod 93 as shown in Figure 5. A knock-off latch 111 is pivotally mounted on the knock-off bar 90.

A knock-off controller is mounted to control the operation of the knock-off, this controller comprising a controller shaft 112 mounted for rocking movement in the side parts 84 of the starting and stopping gage bracket, a controller tail 113 being secured to said shaft and projecting therefrom to underlie the knock-off latch 111. A striking screw is adjustably secured in the tail 113 to strike the latch and actuate it when the tail is moved upwardly. A feed releasing bar 175 and a positioning releasing bar 176 are each secured to the shaft 112 to act in connection with a feed releasing controller 177 and a positioning releasing controller 178, both adjustably secured to the head 16 and having rolls at their lower ends to engage with cams, now to be described, on the bars 175 and 176. A feed releasing cam 179 and a positioning releasing cam 180 are located on the bar 176, the last mentioned cam being adjustably secured to the bar and the first mentioned cam being of considerable length as compared with that last mentioned. The cam 180 is for the purpose of lifting a feeler arm 116 carrying a feeler 117 having a head in which a screw is adjustably secured to be pressed against the material or to be raised therefrom to permit the strip to be accurately positioned by the pilot or leader portion 147 of a punch preparatory to the action of the main part of the punch when such type of leader or pilot, as shown in Figure 6, is used.

Rolls at the lower ends of the controllers 177 and 178 are mounted in latches, the positioning releasing roll being mounted in a positioning releasing latch 181 adapted to abut against a positioning stop 182 on that side of the controller towards the releasing bar, said controller also having a latch release 183 on the side of the head opposite said bar. A feed releasing roll is mounted in a feed releasing latch 184, said latch having a feed releasing stop 185 on that side of the controller opposite the releasing bar and a feed latch release 186 on the opposite side of said controller, these releases being cut-away parts at the bases of forks comprising the heads of the controllers, and between which branches of said heads the latches are mounted. The feed releasing roll acts in connection with a feed releasing cam 187 projecting from the upper part of the bar 175 and at a little greater distance from said bar than that of the cam 179 from its bar, when said bars are in line, as shown in Figure 9.

In the operation of the mechanism just described, the head 16 being at the upper limit of its play the releasing latches will be a little above the position shown in Figures 9 and 10, that is, the roller of the feed releasing latch 181 will be at a point where it has just passed above the cam on the bar 176. In this uppermost position of the heads of the controllers, the strip of stock is free to be fed by the mechanism hereinbefore described, the feeler 117 being held in its raised position by contact of the positioning releasing roller with the feed releasing cam 179. As the plunger head 16 moves downwardly from this raised position the strip of stock will be fed by the feeding mechanism hereinbefore described, at the completion of which feeding movement the feed positioning roller will pass off from the feed releasing cam 179 and the feeler 117 will be lowered to rest upon and hold the strip of stock in a manner that will be readily understood. After the pilot or leader 147 enters an opening in the strip of stock it is necessary that said strip be loose so that the pilot or leader may position it for operation of the dies. Therefore, in the further downward movement of the head 16 and just after the pilot or leader has entered an opening made by previous operations of the dies the feed positioning roller will strike the feed positioning cam 180 and thereby raise the feeler 117 to permit such positioning of the stock by the pilot or leader of the punch. The feeler 117 is held in this raised position by the mechanism just described until the punch has entered the material, but is allowed to drop to again touch said material before said punch leaves said material and said feeler continues in this last named position during a portion of the upward motion of the plunger head 16.

In the downward movement of said feeler, as just described, the feed releasing roller when it strikes the cam 187, moves upwardly, being permitted so to do by the feed latch release 186, and consequently no action of this member takes place at this time. When, however, the head 16, in its upward movement, causes the feed releasing roller to strike the feed releasing cam 187, the latch 184 bearing said roller, abutting against its stop 185, will cause the feeler 117 to be raised to release the strip of stock preparatory to the next feeding movement thereof. In this upward movement of the head 16 the cam 187, being a little in advance of the cam 179, the latter will be held away from its roller and will, therefore, have no influence thereon, but when, during this upward movement of the head 16 and near the completion of such movement, the cam 187 releases its feed roller, the feed positioning roller will consequently pass into contact with the cam 179 and thus retain the feeler 117 in its raised position, in which raised position it has been held during engagement of the rollers with the cams 179 and 187, and such contact of the positioning roller with the cam 179 taking place just about the time the head 16 reaches the limit of its upward movement, this description of the operation having included one cycle of movement of the parts of the machine.

In the operation of this stopping and starting gage the knock-off bar 90 has a continuously reciprocating motion imparted to it by the carrier 27 through the action of the knock-off lever 88, and, therefore, during each cycle of operation of the machine, the notch 91 is moved under the collar 92, the contact of the screw in the feeler 117 with the strip of stock retaining the tail 113 in its lowermost position, thereby permitting the latch 111 to assume a position so that it will not strike said collar in the reciprocating movement of the bar 90.

When, however, the strip of stock is used up to such an extent that it passes from underneath the screw in the feeler 117, and the latter is free to drop as hereinbefore described, no stock being under said feeler to arrest its downward movement, it continues such lowering movement and rocks the shaft 112 moving the tail 113 upwardly and causing the latch 111 to be located opposite the knock-off collar 92. In the next movement of the knock-off bar 90 towards the said collar, the latter will be struck by said latch and the upper end of the clutch releasing rod 93 will be moved to disengage the stop collar 107 from the stop plate 109, and when thus freed the spring 105 will move the clutch lever 94 upwardly, carrying with it the shoe 96 that will now operate to disengage the clutch pin 98 from its mating clutch pin whenever the pin 98 is swept past said shoe. It will thus be seen that after the strip of stock passes from underneath the feeler, the operation of the machine will now be stopped immediately it completes its cycle of movement.

When the machine has been set in continuous operation by the continuous clutch actuating pedal and consequent engagement of the stop collar 107 with the stop plate 109, such continuous operation may be stopped by means of a stopping finger 118 secured to a rock shaft rotatably mounted on the side of the box 11 and having a stopping arm 119 connected by a stopping rod 120 with the intermittent clutch pedal 101 that may be pressed downwardly to operate the finger 118 and thereby move the rod 93 to disengage the collar 107 from the plate 109 and cause the operation of the stop-motion mechanism as hereinbefore described.

As a means for presenting objects cut or blanked from strip material to the next die or plurality of dies for one or a plurality of operations, cut and carry slides 121—122 are secured to and project from the carriers 27, said slides in the constructions shown in Figure 3 working through an opening 127 in the lower die and each slide having a suitable work holding station or a plurality of work holding stations to receive pieces of work or blanks 124 or 194, as shown in Figure 2 that have been cut or blanked from the strip 17 by the action of the punch 125, as shown in Figure 3. The work holding station on the slide at the left in this case comprises mechanism consisting of two arms 188 pivotally mounted on the slide 121 and of suitable shape near one end to hold blanks 124, as hereinafter described, the opposite ends of said arms carrying cams 190, said cam ends of the arms being spring pressed from each other. Positioning rollers 191 and releasing rollers 192 are rotatably mounted on pins suitably secured, as in this case to the die.

A cut and carry slide 122 is secured to and projects from the carrier on the opposite side of the machine, there being mounted on said slide a working holding station or a plurality of work holding stations of similar construction to the one just described. As this carrier 27 is moved towards the left as shown in Figure 2, by the mechanism hereinbefore described, the cams 207 on the arms 208 strike positioning rollers 209 operating the arms to open the fingers thereon to receive the piece 124 when blanked or cut from the strip 17 by the punch 125 shown in Figure 3 and carried by the action of said punch to the under part of the die, said piece 124 being received by the fingers on the arms 208 in a position to which it has been carried in a way to be later described to a position under the punch 126, free to be acted upon by said punch. As the carriers are moved towards the right, as shown in Figure 2, the cams 190 on the arms 188 are carried free and away from the rollers 191 allowing the fingers 189 on said arms to grip a piece 124 and the similar fingers on the arms 208 to grip the piece 194 in a manner that will be readily understood through the action of the hereinbefore mentioned spring, as the cams 207 are carried away from the rollers 209. As the slides continue to be moved towards the right carrying said pieces with them when near the end of said movement the cams 190 strike the releasing rollers 192 operating said arms and fingers thereon to release the piece 124 in a position directly under the punch 126. In this movement the cams 207 on the arms 208 strike releasing rollers 210 and operate the fingers on said arms to release the piece 194 that may be dropped into any suitable discharge chute 140 or ejector or that may be manually removed as may be desired, at which time the slides end their movement towards the right and begin their movement towards the left as hereinbefore described, thus completing one cycle of its movement.

As a means for presenting objects (not necessarily objects cut, blanked or otherwise prepared from sheet or strip material) the cut and carry slide 121 may be provided with a plurality of work holding stations similar to those just described to receive pieces 195 and 196 as shown in Figures 11 and 12. The work holding stations in this case each consists of two sets of arms 197—198 pivotally mounted on the slide 121, and of suitable shape near one end to hold the pieces 195 or 196 as hereinafter described, the opposite ends of said arms being spring pressed from each other and having cams 199 to engage rollers 200 properly mounted for such engagement. Another cut and carry slide 201 is secured to and projects from the carrier on the opposite side of the machine, there being mounted on said slide a work holding station or a plurality of work holding stations (one only being shown) of similar construction to those just described. As the carrier 27 at the right is moved towards the right as shown in Figure 11 (it is shown as not quite at the end of its rightward movement) by the mechanism hereinbefore described, the cams on the arms 197 strike the rollers 200 pressing said cam ends of the arms towards each other and opening the other ends of said arms to receive a piece 195 to be manually or mechanically placed when the slide is in an accessible position substantially the same as shown in Figure 12. As the carrier is moved towards the left as shown in Figures 11 and 12 the cams 199 on the arms 197 and the cams on the set of arms 198 are carried away from their respective rollers allowing in this case the opposite ends of each of said sets of arms carried on slide 121 to grip pieces 195 and 196 respectively (the piece 196 having been moved by the arms 197 to this position in a previous operation) through the action of the hereinbefore mentioned springs and at the same time the arms carried on the slide 201 grip the piece 202 in a similar manner, this piece 202 having been previously moved to this position by the set of arms 198. As the slides move toward the left, said pieces thus gripped are carried forward to position to be gripped by the next succeeding set of arms, near the end of such movement the cams 199 strike rollers 203 operating the arms to release the piece 195 in a position directly under a punch 204, as shown in Figure 12, and the arms 198 being similarly operated by rollers 211 to release the piece 196 directly under a punch 205 while the piece 202 is moved by the arms 206 to a position to be dropped into any suitable discharge chute or ejector (not shown) and thereby removed from the machine, the arms 206 in this movement of the slide 201 to the left having been operated by the cams thereon contacting with releasing rollers 212. Pairs 213—214 of spring pressed stop pins are employed to receive the piece of work or blanks and hold them against retrograde movement from a position to which they have been carried and to permit release of the grasping fingers therefrom, these stop pins being constructed and operating in a manner similar to the pins 193 hereinbefore described with respect to the device of Figures 2 and 3 and for which reason a further and detailed description is omitted herein, at which time the slides end their movement toward the left and begin their movement toward the right as hereinbefore described, thus completing one cycle of its movement.

In order that the strip of stock 17 may be firmly held at all times, except when it is being fed and when a positioning member is operating upon it, a stocking holding mechanism is provided that comprises a holding mechanism support 128 adjustably secured to a holding mechanism bracket 129 secured to the table 15, as shown in Figures 5 and 6. A holding mechanism rock shaft 130 is mounted in said support with a holding arm 131 secured thereto and projecting therefrom, a holding head 132 adjustably secured in said arm, and a holding finger 133, in the form of a screw, mounted in said head. A positioning releasing bar 134 and a feed releasing bar 135 are each secured to the shaft 130 to act in connection with a positioning releasing controller 136 and a feed releasing controller 137, both adjustably secured to the head 16 and having rolls at their lower ends to engage with cams, now to be described, on the bars 134 and 135. A feed releasing cam 138 and a positioning releasing cam 139 are located on the bar 134, the last mentioned cam being adjustably secured to the bar and the first mentioned cam being of considerable length as compared with that last mentioned. The cam 139 is for the purpose of permitting the strip of material to be positioned by the pilot portion 147 of a punch preparatory to the action of the main part thereof, when such pilot, as shown in Figure 6, is used.

The rolls at the lower ends of the controllers 136 and 137 are mounted in latches, the positioning releasing roll being mounted in a positioning releasing latch 141 adapted to abut against a positioning stop 142 on that side of the controller towards the releasing bar, said controller also having a latch release 143 on the side of the head opposite said bar. A feed releasing roll is mounted in a feed releasing latch 144, said latch having a feed releasing stop 145 on that side of the controller opposite the releasing bar and a latch release 146 on the opposite side of said controller, these releases being cut-away parts at the bases of forks comprising the heads of the controllers, and between which branches of said head the latches are mounted. The feed releasing roll acts in connection with a feed releasing cam 148 projecting from the upper part of the bar 135 and at a little greater distance from said bar than that of the cam 138 from its bar, when said bars are in line as shown in Figure 6.

In the operation of the holding mechanism just described, the head 16 will be at the upper limit of its play when the releasing latches are a little above the position shown in Figure 6, that is, the roller of the feed releasing latch 144 will be at a point where it has just passed above the cam on the bar 135. In this uppermost position of the heads of the controllers, the strip of stock is free to be fed by the mechanism hereinbefore described, the holding head 132 being held in its raised position by contact of the positioning releasing roller with the feed releasing cam 138. As the plunger head 16 moves downwardly from this raised position the strip of stock will be fed by the feeding mechanism hereinbefore described, at the completion of which feeding movement the feed positioning roller will pass off from the feed releasing cam 138 and the head 132 will be lowered to hold the strip of stock in a manner that will be readily understood. As the pilot or leader 147 enters an opening in the strip of stock it is necessary that said strip be loose so that the leader may position it for operation of the dies. Therefore in the further downward movement of the head 16, and just after the leader has entered an opening in the strip of stock made by previous operations of the dies, the feed positioning rollers will strike the feed positioning cam 139 and thereby again raise the head 132 to permit such positioning of the strip of stock by the leader of the uper die or punch. This release is for an instant only when the roller is released from the cam and the head 132 is allowed to drop to again hold the strip of stock until after the operation of the dies and to again grip the strip and during a portion of the upward motion of the plunger head.

In the downward movement of said head 16, as just described, the feed releasing roller when it strikes the cam 148, moves upwardly, being permitted so to do by the feed release 146, and consequently no action of this member takes place at this time. When, however, the head 16, in its upward movement, causes the feed releasing roller to strike the feed releasing cam 148, the latch 144 bearing said roller abutting against its stop 145 will cause the holding head 132 to be raised to release the strip of stock preparatory to the next feeding movement thereof. In this upward movement of the head 16 the cam 148, being a little higher or in advance of the cam 138, the latter will have no influence on its feed roller, but when during this upward movement of the head 16, and near the completion of such movement the cam 148 releases its feed roller, the head 132 being in its raised position at this time, the feed positioning roller will pass into contact with the cam 138 and thus retain the head 132 in its raised position, such contact of the positioning roller with the cam 138 taking place just about the time the head 16 reaches the limit of its upward movement, this description of the operation having included one cycle of movement of the parts of the machine.

At this point it should be noted that the feed releasing bar 135 is spring pressed toward its controlling roller, and also that the latches 141 and 144 are spring pressed into contact with their respective stops.

In order to lubricate the strip of material stock for the operation of the dies, an oiling apparatus is attached to that bracket 18 from which the strip of stock is passed to said dies. This oiling device comprises a reservoir 149 with guides 150 projecting upwardly from its front edge. An oiling roller 152 is mounted in bearings in opposite sides of this reservoir. A second and upper oiling roller 153 is rotatably mounted in bearing arms 154 supporting tank trunnions 156 having their ends located in grooves 157 in roller supports 158 rising from the side parts of the reservoir 149. This roller is pressed downwardly as by springs, as shown in Figure 4 and the arms 154 are pulled in one direction as by means of a spring, the draft force imparted to the rolls by the movement of the strip of stock holding the arms against a roll stop 159 for a purpose now to be described.

A tank 160 is attached to the trunnions 156 at their inner ends, this tank having an opening in its bottom with a valve 161 to control the flow of oil from the tank into a discharge chamber 162 having a series of discharge ports 163 through a recessed wall of said chamber. This recess conforms in shape to the roll 153, which roll, when in the position caused by the spring hereinbefore mentioned, will close the ports and prevent escape of oil therefrom, the roll thus acting as a valve. When the strip of stock begins to move its draft on said roll will move it against the tension of the spring, or springs, on the arms 154, moving said arms against the stop 159 and opening the ports 163 to permit oil to flow to the surface of the roll 153.

It is necessary, at times to move the strip of stock with respect to the dies and to the feed mechanism, one such instance occurring when the strip of stock has been used up. In order to do this quickly the following strip moving mechanism is provided: A strip moving roll 164 is driven by means of a belt passing about a pulley 165, the shaft supporting said roll and pulley being mounted in a bracket 166 secured to that bracket 18 preferably on the opposite side of the machine from the oiling device hereinbefore described. A strip moving actuating roll 167 is mounted in a swinging frame 168, said frame comprising a rock shaft 169 mounted in supports 170 rising from the bracket 166. A frame actuating arm 171 secured to the shaft 169 is also connected with a strip moving frame actuating rod 172. In the connection herein shown this rod passes loosely through an opening in a lug on said frame and has a spring interposed between the washer or other enlargement on the end of the rod and said lug, thus forming a resilient connection. In order that the feed device may be conveniently released, the rod 172 is also connected with extensions from the handles 71, as shown in Figs. 1 and 2, so that when the handles 71 are operated to release the feed device, the roll 167 will be pressed against the strip of stock and thereby move it with respect to the dies, such strip, if it has been used up, being quickly removed from the machine. This mechanism is so arranged that the release of the feed device from the strip of stock will take place before the roll 167 has engaged it so that the feed device may be released without operation of the strip moving mechanism. A spring connected with the bracket 166 and the arm 171 holds the roll 167 normally away from the strip of stock, any suitable stop (not shown) being employed to determine its normal position on the frame.

I claim:

1. A dieing machine having a frame with a punch and die co-operatively supported thereon, a feed mechanism on one side of the die, a feed mechanism on the other side of the die, means for reciprocating said feed mechanisms toward and from the die, and a stop finger arranged to co-operate with one of said feed mechanisms for engaging the stock and retaining it, said stop finger being released from the stock by the engagement therewith of the feed mechanism just before the said mechanism begins to feed the stock.

2. A dieing machine having a frame with a punch and die co-operatively supported thereon, a feed mechanism on one side of the die, means for reciprocating the said mechanism toward and from the die, said feed mechanism having a finger for engaging the stock and feeding the same, a stop finger arranged to co-operate with said feed mechanism for engaging the stock and retaining it, said stop finger being released from the stock by the said finger when the feed finger is engaged with the stock.

3. A dieing machine including a frame with means to operatively support dies thereon, a friction feed mechanism on one side of said dies to feed stock thereto, means for moving said feed mechanism toward and from the dies, a positive feed mechanism on the opposite side of said dies to feed stock thereto, and means for moving said positive feed mechanism toward and from the dies.

4. A dieing machine including a frame with means to operatively support dies thereon, feed mechanism of one kind on one side of said dies to feed stock thereto, means for moving said feed mechanism toward and from the dies, feed mechanism of another kind on the opposite side of said dies to feed stock thereto, means for moving the last mentioned feed mechanism toward and from the dies, and mechanisms of a similar character on both sides of said dies for operating both of said feed mechanisms to engage them with and disengage them from said stock.

5. A dieing machine including a frame with means to operatively support dies thereon, friction feed mechanism on one side of said dies to feed stock thereto, means for moving said feed mechanism toward and from the dies, a positive feed mechanism on the opposite side of said dies to feed stock thereto, means for moving said mechanism toward and from the dies to feed stock thereto, and mechanisms of a similar character on both sides of said dies for operating both of said feed mechanisms to engage them with and disengage them from said stock.

6. A dieing machine including a frame with means to operatively support dies thereon, carriers located on opposite sides of said dies, means for moving each of said carriers toward and from the dies, a gripper feed member located on one of said carriers, a positive feed member located on the other of said carriers, and means of a like character to impart a rocking movement to both of said feed members to feed stock to said dies.

7. A dieing machine including a frame with means to operatively support dies thereon, feed mechanism supported on the opposite sides of said dies to feed stock thereto, means for operating each feed mechanism to simultaneously release said stock and to reengage said mechanism with said stock, and means for moving each of said mechanisms toward and from the dies.

8. A dieing machine having a frame with a punch and die co-operatively supported thereon, a feed mechanism, mechanism for reciprocating said feed mehanism toward and from the die, means for binding the stock and retaining it from displacement, and mechanism for causing said binding means to engage the stock when the feeding mechanism is retracted and for causing said binding means to release the stock as a part of the punch enters the stock thereby allowing the stock to be positioned by said part of the punch.

9. A dieing machine having a frame with a punch and die co-operatively supported thereon, a feed mechanism, mechanism for reciprocating said feed mechanism toward and from the die, means for retaining the stock when the feed mechanism is retracted, and means for causing said stock retaining means to engage the stock twice during each cycle of the machine, said retaining means releasing the stock while it is being fed and also releasing the stock as the punch is about to act thereon.

10. A dieing machine including a frame with means to operatively support dies thereon, a feed mechanism to feed stock to said dies, means for engaging said mechanism with and for disengaging it from said stock, means for holding said stock when said feed mechanism is disengaged therefrom, and means for disengaging said feed mechanism and for disengaging said holding means simultaneously from said stock to permit operation of the dies to center said stock.

11. A dieing machine including a frame with means to operatively support dies thereon, feed mechanism to feed stock to said dies, means for engaging said mechanism with and for disengaging it from said stock, means for holding said stock when said feed mechanism is disengaged therefrom, means for disengaging said holding means to permit feed of said stock, and for disengaging said holding means to permit centering of said stock by said dies.

12. A dieing machine having a frame with a punch and die co-operatively supported thereon, mechanism for feeding stock to the punch and die, means for reciprocating said feed mechanism, and means independent of the feed mechanism for discharging the waste of the stock, said discharging means being inoperative when the feed mechanism is in operation, and adapted to be set in operation when the feed mechanism is put out of operative action.

13. A dieing machine having a frame with a punch and die co-operatively supported thereon, mechanism for feeding stock to the punch and die, means for reciprocating said feed mechanism, and rolls for discharging the waste of the stock, said rolls being out of effective action when the feed mechanism is in operation, and adapted to be set in operative action when the feed mechanism is rendered inactive.

14. A dieing machine including a frame with means to operatively support dies thereon, feed mechanism to feed stock to said dies, means for releasing said feed mechanism from said stock, means including a movably mounted roller for moving stock with respect to said dies, and means connected with said roller to move it into contact with said stock and also connected with said releasing means to release said stock.

15. A dieing machine including a frame with means to operatively support dies thereon, a carrier, means for imparting reciprocating movement to the carrier, a member on said carrier to engage a strip of stock, and means fixed at each end of the path of movement of the carrier to engage said member with and disengage it from said strip.

16. A dieing machine having a frame with a punch and die co-operatively supported thereon, a reciprocatory stock carrier, means for reciprocating the carrier toward and from the die, a member on the carrier adapted to grip and release a strip of stock, means on the carrier for locking and releasing the gripping member, and means located off the carrier at each end of the carrier path adapted to engage and actuate said locking and releasing means.

17. A dieing machine including a frame with means to operatively support dies thereon, a carrier, means for imparting reciprocating movement to the carrier, a member on said carrier to engage a strip of stock, and means to operate said member to engage it with and disengage it from said strip, said member operating means being located off the carrier and operating independently of the movement thereof.

18. A dieing machine including a frame with means to operatively support dies thereon, a carrier, means for imparting reciprocating movement to the carrier, a member on said carrier to engage a strip of stock, means operating independently of the movement of the carrier to actuate said member in one position, means for actuating it in another position, and a connection between both of said member actuating means for actuating both of said members.

19. A dieing machine including a frame with means to operatively support dies thereon, a carrier, means for imparting reciprocating movement to the carrier, a member on said carrier to engage a strip of stock to feed it to said dies, movably mounted means to actuate said member, and means for operating said actuating means independently of the movement of the carrier.

20. A dieing machine including a frame with means to operatively support dies thereon, a carrier, means for imparting reciprocating movement to the carrier, a member on said carrier to engage a strip of stock to feed it to said dies, movably mounted means to actuate said member at each end of the path of movement of the carrier, and means for operating both of said actuating members independently of the movement of the carrier.

21. A dieing machine having a frame with a punch and die co-operatively supported thereon, a stock carrier on each side of the die, mechanism for reciprocating said carriers, means on each carrier for gripping and releasing a strip of stock, means on each carrier for locking and releasing said gripping means, means off the carrier for operating said locking and releasing means, and a common mechanism for actuating said operating means.

22. A dieing machine including a frame with means to operatively support dies thereon, carriers located on opposite sides of said dies, means for imparting reciprocating movement to each of said carriers, a member on each of said carriers to engage a strip of stock, means separately mounted to engage each of said members in different positions on each of said carriers, said member actuating means including a member common to all and operating both of the actuating means appurtenant to each of said members.

23. A dieing machine having a frame with a punch and die co-operatively supported thereon, a stock carrier on each side of the die, means on the carriers for engaging and releasing stock, an oscillatory lever for imparting a reciprocatory movement to each carrier, a rocker arm for oscillating each of said levers, a rod connecting said rocker arms, an operating lever for reciprocating said rod, and an oscillatory cam for swinging said operating lever.

24. A dieing machine having a frame with a punch and die co-operatively supported thereon, a stock carrier on each side of the die, means on the carriers for engaging and releasing stock, an oscillatory lever for imparting a reciprocatory movement to each carrier, a rocker arm for oscillating each of said levers, a rod connecting said rocker arms, an operating lever for reciprocating said rod, an oscillatory cam for swinging said operating lever, and a crank for oscillating said cam.

25. A dieing machine having a frame with a punch and die co-operatively supported thereon and means for feeding stock to the punch and die, said feeding means comprising a reciprocatory carrier, mechanism on said carrier for frictionally gripping stock, mechanism on said carrier for positively engaging stock, and means whereby either of said mechanisms may be temporarily thrown out of commission.

26. A dieing machine having a frame with a punch and die co-operatively supported thereon and means for feeding stock to the punch and die, said means comprising a reciprocatory carrier, mechanism on said carrier for frictionally gripping stock, mechanism on said carrier for positively engaging stock, means whereby either of said mechanisms may be temporarily thrown out of commission, and mechanism for positively engaging stock and retaining it in position as the carrier is retracted after feeding stock, said retaining mechanism being engaged and released from the stock at the end of the return movement of the carrier.

27. A dieing machine having a frame with a punch and die co-operatively supported thereon and means for feeding stock to the punch and die, said means comprising a reciprocatory carrier, a finger on said carrier adapted to positively engage and feed stock, a finger adapted to positively engage stock and retain it in position when the carrier is retracted after feeding stock, said stop finger being released from the stock by the action of the feed finger at the end of the return movement of the carrier.

28. A dieing machine including a frame with means to operatively support dies thereon, a carrier, means for imparting reciprocating movement to said carrier, a feed finger mounted on said carrier to engage openings formed in a strip of stock, a stop finger movable supported to engage the edges of said openings, and means for operating each of said fingers to engage them with and disengage them from said openings, 29. A dieing machine including a frame with means to operatively support dies thereon, a carrier, means for imparting reciprocating movement to said carrier and a feed finger mounted on said carrier to engage openings formed in a strip of stock, a stop finger movably supported to engage the edges of said openings, and means for simultaneously raising one of said fingers and lowering the other.

30. A dieing machine including a frame with means to operatively support dies thereon, a carrier, means for imparting reciprocating movement to said carrier, a feed finger mounted on said carrier to engage openings formed in a strip of stock, a stop finger movably supported to engage the edges of said openings, a rock shaft mounted on the carrier, means for operating said rock shaft, and a connection between said rock shaft and both of said fingers for simultaneously raising one and lowering the other.

31. A dieing machine including a frame with means to operatively support dies thereon and including a reciprocating member, a holding member movably mounted to engage a strip of stock that is operated upon by said dies, mechanism to control the operations of said holding member, said controlling mechanism including a controller and a co-operating member, one of which is mounted for reciprocating movement and one of which is connected to operate said holding member.

32. A dieing machine including a frame with means to operatively support dies thereon and including a reciprocating member, a holding member movably mounted to engage a strip of stock that is operated upon by said dies, and a mechanism to control operations of said holding member, said controlling mechanism including a controller and a cooperating member, one of which is mounted for reciprocating movement and the other of which is connected to operate said holding member.

33. A dieing machine including a frame to support a die, a die operating head mounted for reciprocating movement on the frame, a holding member mounted on the frame to engage a strip of stock that is operated upon by said dies, and a mechanism to control operations of said holding member, said controlling mechanism including a controller and a cooperating member, one of which is mounted on said head and one of which is connected to operate said holding member.

34. A dieing machine including a frame to support a die, a die operating head mounted for reciprocating movement on the frame, a holding member mounted on the frame to engage a strip of stock that is operated upon by said dies, and a mechanism to control operations of said holding member, said controlling mechanism including a controller and a cooperating member, one of which is mounted on said head and the other of which is connected to operate said holding member.

35. A dieing machine including a frame to support a die, a die operating head mounted for reciprocating movement on the frame, a holding member mounted on the frame to engage a strip of stock that is operated upon by said dies, and a mechanism to control operations of said holding member, said controlling mechanism including a controller mounted on said head and a cooperating member connected with said holding member to operate it.

36. A dieing machine including a frame with means to operatively support dies thereon and including a die supporting reciprocating head, a holding member movably mounted to engage a strip of stock that is operated upon by said dies, and a set of controllers and a set of cooperating members, one of which sets is mounted on said reciprocating head and the other of which sets is connected to operate said holding member.

37. A dieing machine including a frame with means to operatively support dies thereon and including a die supporting reciprocating head, a holding member movably mounted to engage a strip of stock that is operated upon by said dies, a set of controllers mounted on said head and a set of cooperating members mounted on said frame and connected with said holding member to operate it.

38. A dieing machine including a frame with means to operatively support dies thereon and including a reciprocating member, a holding member movably mounted to engage a strip of stock that is operated upon by said dies, and a set of controllers and a set of cooperating members, one of which sets is mounted on said reciprocating member and the other of which sets is connected to operate said holding member, each member of the set of controllers having a controller member operating independently of the controlling member on the other member of the set, and both members of the set of cooperating members being rigidly connected with said holding member.

39. A dieing machine including a frame to support a die and a die operating head mounted for reciprocating movement on said frame, a holding member movably mounted to engage a strip of stock that is operated upon by said dies, a set of controllers mounted on said head, each controller in said set having a member mounted thereon for movement independently of a member on the other controller, and a set of cooperating members each of which is rigidly connected with said holding member.

40. A dieing machine including a frame with means to operatively support dies thereon, means for feeding a strip of material to the dies, an oil tank having ports therein, and a roll movably mounted to control flow of oil through said ports, said roll being adapted to engage said strip.

41. A dieing machine including a frame with means to operatively support dies thereon, means for feeding a strip of material to the dies, an oil tank having ports in its under-surface, and a roll movably mounted in contact with said strip to be moved thereby away from said ports by the draft of said strip on the roll.

42. A dieing machine including a frame with means to operatively support dies thereon, means for feeding a strip of material to the dies, an oil tank having a recess in its under-surface open on one side with ports in the wall of said recess, and a roll to close said ports and to move in said opening to uncover said ports.

43. A dieing machine having a frame with a punch and die co-operatively supported thereon, means for feeding a strip of stock to the punch and die, means acting independently of said feeding means to remove waste stock, said feeding means and waste removing means being independent of each other, and means for throwing the feeding means out of action and the waste removing means into action coincidently.

44. A dieing machine having a frame with a punch and die co-operatively supported thereon, reciprocatory means for feeding a strip of material to the punch and die, a pair of rollers adapted to engage the strip of material after it has passed the punch and die, and means for engaging said rollers with the strip and coincidently throwing the the reciprocatroy feeding mechanism out of commission.

45. A dieing machine including a frame with means to operatively support dies thereon, means for feeding a strip of material to said dies, means to move said strip independently of said feeding means but normally disengaged from the strip, and means for engaging said moving means with the strip to move it.

46. A dieing machine including a frame with means to operatively support dies thereon, means for feeding a strip of material to said dies, means to move said strip independently of said feeding means but normally disengaged from said strip, and means to disengage said feeding means from the strip and to engage said moving means therewith to move it.

47. A dieing machine including a frame with means to operatively support dies thereon, machine operating mechanism including means for feeding a strip of material to said dies, gage mechanism including a reciprocating member and a stop actuating member adapted to engage said strip of material, means for operating said reciprocating member, driving mechanism, means for connecting said machine operating and driving mechanisms, and an intermittent connection between said gaging mechanism and said means connecting said machine and driving mechanisms to operate the latter when said stop actuating member is permitted to have unrestricted movement.

48. A dieing machine including a frame with means to operatively support dies thereon, machine operating mechanism including a reciprocating carrier for feeding a strip of material to said dies, gage mechanism including a reciprocating member operatively connected with said carrier and a stop actuating member adapted to engage said strip of material, driving mechanism, means for connecting said machine operating and driving mechanisms, and an intermittent connection between said gage mechanism and said connection between the machine and driving mechanisms to operate the latter when unrestricted movement is permitted for said stop actuating member.

49. A dieing machine including a frame with means to operatively support dies thereon, a machine operating mechanism including means to feed a strip of material to said dies, gage mechanism including a reciprocating member operatively connected with said machine operating mechanism, a clutch mechanism including an operating member normally forced in one direction, means for holding said member against said force, means for intermittently connecting said operating member with said reciprocating member, a finger adapted to engage said strip, and a connection between said finger and said intermittently connecting means for operating the latter.

50. A dieing machine including a frame with means to operatively support dies thereon, machine operating mechanism including means for feeding a strip of material to said dies, gaging mechanism including a reciprocating member and a latch, a member to engage said strip of material and operatively connected with said latch to operate it, a clutch mechanism including a clutch operating rod normally forced in one direction, means for holding said rod against said force, and means on said rod to receive said latch for disengagement of the rod when the latch is in one position.

51. In combination with a clutch mechanism to control the operations of a machine and including a continuous clutch operating pedal and an intermittent clutch operating pedal, a clutch operating lever connected with one of said pedals, a clutch operating rod connected to said lever, means for forcing said rod in one direction, means for holding said rod against said force, a stop mechanism for releasing said rod, and a member connected with said intermittent clutch operating pedal to release said rod.

52. A dieing machine comprising a frame with means to operatively support dies thereon and including a reciprocating member, means for feeding a strip of stock to said reciprocating member, an engaging member movably mounted to touch said strip, and mechanism to control the operation of said enaging member and including a controller and a cooperating member, one of which is mounted for reciprocating movement and one of which is connected to operate said engaging member.

53. A dieing machine comprising a frame with means to operatively support dies thereon and including a reciprocating member, means for feeding a strip of stock to said reciprocating member, an engaging member movably mounted to touch said strip, and mechanism to control the operations of said engaging member and including a controller and a cooperating member one of which is mounted for reciprocating movement and the other of which is connected to operate said engaging member.

54. A dieing machine comprising a frame to support a die, a die operating head mounted for reciprocating movement on the frame, means for feeding a strip of stock underneath said head, an engaging member movably mounted to touch said strip, and a mechanism to control the operation of said engaging member, said controlling mechanism including a controller and a cooperating member, one of which is mounted on said head and one of which is connected to operate said engaging member.

55. A dieing machine comprising a frame to support a die, a die operating head mounted for reciprocating movement on the frame, means for feeding a strip of stock underneath said head, an engaging member movably mounted to touch said strip, and a mechanism to control operations of said engaging member, said controlling mechanism including a controller and a cooperating member, one of which is mounted on said head and the other of which is connected to operate said engaging member.

56. A dieing machine comprising a frame to support a die, a die operating head mounted for reciprocating movement on the frame, means for feeding a strip of stock underneath the head, an engaging member movably mounted to touch said strip, and a mechanism to control operation of said engaging member, said controlling mechanism including a controller mounted on said head and a cooperating member connected with said engaging member to operate it.

57. A dieing machine comprising a frame with means to operatively support dies thereon and including a reciprocating member, means for feeding a strip of stock to said reciprocating member, an engaging member movably mounted to touch said strip, and a set of controllers and a set of cooperating members, each of said sets comprising a plurality of members and one of which sets is mounted on said reciprocating member and the other of which sets is connected to operate said engaging member.

58. A dieing machine comprising a frame with means to operatively support dies thereon and including a reciprocating member, means for feeding a strip of stock to said reciprocating member, an engaging member movably mounted to touch said strip, and a set of controllers and a set of cooperating members, each of said sets comprising a plurality of members and one of which sets is mounted on said head and the other on said frame.

59. A dieing machine comprising a frame with means to operatively support dies thereon and including a reciprocating member, means for feeding a strip of stock to said reciprocating member, an engaging member movably mounted to touch said strip, and a set of cooperating members, each of said sets comprising a plurality of members and one of which sets is mounted on said reciprocating member and the other of which sets is connected to operate said holding member, each member of the set of controllers having a controller member operating independently of the controller member on the other member of the set and both members of the set of cooperating members being rigidly connected with said engaging member.

60. A dieing machine comprising a frame with a head to operatively support dies thereon and including a reciprocating member, means for feeding a strip of stock to said reciprocating member, an engaging member movably mounted to touch said strip, a set of controllers mounted on said head, each controller in each set having a member mounted thereon for movement independently of a member on the other controller, and a set of cooperating members each of which is connected with said engaging member.

61. A dieing machine comprising a frame with means to operatively support dies thereon and including a reciprocating member, means for feeding a strip of stock to said reciprocating member, an engaging member movably mounted to touch said strip, a set of controllers comprising a plurality thereof, a set of cooperating members comprising a plurality thereof, each of which cooperating members is operatively connected with said engaging member, and means on one of said sets to effect operation of one controller by movement of the reciprocating member in one direction and to effect operation of another controller by movement of the reciprocating member in another direction.

62. A dieing machine comprising a frame with means to operatively support dies thereon and including a reciprocating member, means for feeding a strip of stock to said reciprocating member, an engaging member movably mounted to touch said strip, a set of controllers comprising a plurality thereof, a set of cooperating members comprising a plurality thereof, each of which cooperating members is operatively connected with said engaging member, means on one member of one of said sets to effect a certain operation of the engaging member by movement of the reciprocating member in one direction, and means on another member of one of said sets to effect a different operation of the engaging member by movement of the reciprocating member in another direction.

63. A dieing machine comprising a frame with means to operatively support dies thereon and including a reciprocating member, means for feeding a strip of stock to said reciprocating member, an engaging member movably mounted to touch said strip, a set of controllers comprising a plurality thereof, and a set of cooperating members comprising a plurality thereof and each of which cooperating members is operatively connected with said engaging member, and cams differently arranged on a plurality of said cooperating members to effect operation of said engaging member by movement of the reciprocating member in one direction and to effect another movement of said engaging member by movement of the reciprocating member in another direction.

64. A dieing machine comprising a frame with means to operatively support dies thereon and including a reciprocating member, means for feeding a strip of stock to said reciprocating member, a starting and stopping gage including a member to engage the end of a strip of stock for starting purposes and to thereafter touch said strip of stock, a driving member for said machine, driving mechanism therefor, means for connecting said driving member and driving mechanism, and an operative connection between said connecting means and said engaging member for operation of the former by the latter.

65. A dieing machine comprising a frame with means to operatively support dies thereon, means for feeding a strip of material to said dies and including a mechanically operated reciprocating cam bar for locking and releasing said feed means, and means for moving said bar to effect releasing and locking action thereof.

66. A dieing machine comprising a frame with means to operatively support dies thereon, means for feeding a strip of material to said dies and including a mechanically operated reciprocating cam bar, and a manually operated lever having fingers to engage said bar to move it in opposite directions for locking and releasing action thereof.

67. A dieing machine having a frame with a punch and die co-operatively supported thereon, means for feeding stock to the punch and die, and mechanism for reciprocating said feeding means, said mechanism including an adjustable oscillatory cam disk and a crank mechanism for oscillating said disk.

68. A dieing machine having a frame with a punch and die co-operatively supported thereon, means for feeding stock to the punch and die, and mechanism for reciprocating said feeding means, said mechanism including a cam disk having a cam groove shaped to give an extended pause at the end of the movement of the feeding means, said cam disk being adjustable so that the length of said pause may be varied.

69. A dieing machine having a frame with punches and dies co-operatively supported thereon, a slide with means for feeding stock to the punches and dies, mechanism for reciprocating said slide, and means connected with said slide and movable in the same direction therewith for receiving blanks in one position of the slide and carrying them to another position.

70. A dieing machine comprising a frame with means to operatively support dies thereon and including a reciprocating member, a plurality of slides mounted for reciprocating movement with respect to said member, and means on each of said slides to receive and hold a blank, a holder on one slide being positioned to convey said blank into position to be received by a holder on the other slide.

71. A dieing machine comprising a frame with means to operatively support dies thereon and including a reciprocating member having a plurality of working points thereon, a plurality of slides mounted for reciprocating movement with respect to said member, and means on each of said slides to hold a blank for operation at each of said working points, the holder on one slide being positioned to receive a blank and to convey it from one to another of said working points and to be received by the holder on the other of said slides.

72. A dieing machine including a frame with means to operatively support dies thereon, a carrier, means for imparting reciprocating movement to the carrier, a member on said carrier to engage a strip of stock, means upon the carrier to operate said member, a lever located off the carrier to operate said operating means, said lever being normally located in a position out of engagement with said member operating means at its extreme limits of movement, and means for operating said lever.

WILLIAM G. ALLEN.